(12) United States Patent
Kratzer

(10) Patent No.: US 8,424,840 B2
(45) Date of Patent: Apr. 23, 2013

(54) VALVE CARTRIDGE FOR A SOLENOID VALVE, AND ASSOCIATED SOLENOID VALVE

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 12/742,215

(22) PCT Filed: Sep. 23, 2008

(86) PCT No.: PCT/EP2008/062674
§ 371 (c)(1),
(2), (4) Date: May 10, 2010

(87) PCT Pub. No.: WO2009/059844
PCT Pub. Date: May 14, 2009

(65) Prior Publication Data
US 2010/0264341 A1 Oct. 21, 2010

(30) Foreign Application Priority Data
Nov. 8, 2007 (DE) .......................... 10 2007 053 301

(51) Int. Cl.
*F16K 31/02* (2006.01)
(52) U.S. Cl.
USPC ................. 251/129.15; 251/129.02; 251/360; 303/119.2
(58) Field of Classification Search ............. 251/129.02, 251/129.15, 360, 361, 362, 363; 303/119.1, 303/119.2; 335/297, 298
See application file for complete search history.

(56) References Cited

U.S. PATENT DOCUMENTS

| 2,698,159 | A | * | 12/1954 | Crum ........................ 251/129.19 |
| 6,119,966 | A | * | 9/2000 | Wagner et al. ............. 239/585.3 |
| 6,848,404 | B2 | * | 2/2005 | Maeyama et al. .......... 123/90.17 |
| 7,000,633 | B2 | * | 2/2006 | Okada et al. ................... 137/550 |
| 7,041,217 | B1 | * | 5/2006 | Close et al. .................... 210/232 |
| 7,108,008 | B2 | * | 9/2006 | Moreno ..................... 137/454.2 |
| 2006/0284129 | A1 | * | 12/2006 | Krishnaswamy et al. ........................ 251/129.15 |
| 2007/0164244 | A1 | | 7/2007 | Kratzer |

FOREIGN PATENT DOCUMENTS

| EP | 1810902 A2 | 7/2007 |
| WO | 2007033856 A1 | 3/2007 |
| WO | 2008058803 A1 | 5/2008 |

\* cited by examiner

Primary Examiner — Eric Keasel
Assistant Examiner — Seth Faulb
(74) Attorney, Agent, or Firm — Maginot, Moore & Beck

(57) ABSTRACT

The invention relates to a valve cartridge for a solenoid valve having a capsule, a magnetic armature that is movably guided within the capsule, a valve insert inserted into the capsule at a first end, and a valve body, which is pressed into a second end of the valve insert, and having a main valve seat. The magnetic armature, moved by a generated magnetic force, moves a tappet that is guided within the valve insert. The tappet has a locking element which includes a sealing element which plunges into the main valve seat of the valve body in a sealing manner for carrying out a sealing function, and an associated solenoid valve. According to the invention, the valve insert is configured as a slotted bushing, having a collar integrated onto the second end of the valve insert in order to increase an outer diameter and a shape stability of the valve insert.

20 Claims, 4 Drawing Sheets

US 8,424,840 B2

VALVE CARTRIDGE FOR A SOLENOID VALVE, AND ASSOCIATED SOLENOID VALVE

CROSS-REFERENCE TO RELATED APPLICATION

This application is a 35 USC 371 application of PCT/EP2008/062674 filed on Sep. 23, 2008.

BACKGROUND OF THE INVENTION

1. Field of the Invention

The invention relates to a valve cartridge for a solenoid valve, and to an associated solenoid valve.

2. Description of the Prior Art

A conventional solenoid valve, particularly for a hydraulic unit, which is used for instance in an anti-lock brake system (ABS) or a traction control system (TC system) or an electronic stability program system (ESP system), is shown in FIG. 1. As can be seen from FIG. 1, the conventional solenoid valve 1, which is embodied for instance as a regulating valve that is open when without current, includes a magnet assembly 2 for generating a magnetic flux, which includes a housing jacket 2.1, a winding holder 2.2, a coil winding 2.3, and a cover disk 2.4; and a valve cartridge 7, which includes a capsule 7.1, a valve insert 10 inserted by a first end 10.2 into the capsule 7.1, which valve insert is additionally joined to the capsule 7.1 via a sealing weld 7.2, a magnet armature 4 having a tappet 12, and a restoring spring 6. By means of supplying current to the coil winding 2.3 via electrical terminals 2.5, the magnet assembly 2 generates a magnetic force which moves the longitudinally movable magnet armature 4, along with the tappet 12 that includes a closing element 12.1 with a main sealing element 12.2, counter to the force of the restoring spring 6 against the valve insert 10. The valve insert 10 conducts the magnetic flux, introduced by the magnet assembly 2 via the cover disk 2.4, axially across an air gap 3 in the direction of the magnet armature 4.

In addition, on a second end 10.1, the valve insert 10 receives the so-called valve body 11, which includes a main valve seat 8 into which the main sealing element 122, embodied as a sealing dome, plunges sealingly in order to realize the sealing function of the solenoid valve 1. For the purpose of being calked to a fluid block, a calking flange 10.3 is integrally formed onto the valve insert 10. As can also be seen from FIG. 1, a lower valve part 14 is pressed and braced against the valve insert 10 axially and this lower valve part includes a check valve 14.2 disposed eccentrically to the main axis 1.1 of the valve. The lower valve part 14, embodied for instance as a plastic insert, additionally serves the purpose of sealing off from a surrounding fluid block, for sealing off from the valve body 11, and for receiving a flat filter 14.1.

ADVANTAGES AND SUMMARY OF THE INVENTION

The valve cartridge according to the invention for a solenoid valve has the advantage over the prior art that a valve insert is embodied as a slit sleeve, and on one end of the valve insert, into which a valve body is press-fitted, a collar is integrally formed, in order to increase an outside diameter and the strength depending on shape or design of the valve insert. By the integral forming of the collar, the outside diameter and the strength depending on shape or design of the valve insert are increased, so that the valve insert is advantageously capable, without additional components and without impermissible widening, of absorbing radially acting press-fitting forces which arise when the valve body is press-fitted into the end of the valve insert embodied as a slit sleeve. As a further advantage as a result of the integrally formed collar, there is an increased contact area for a lower valve part pressed and braced axially against the valve insert. Moreover, an introduction edge for the valve body can be embodied more favorably for non-metal-cutting mounting of the valve body, for instance by means of an embodied radius.

It is especially advantageous that the integrally formed collar of the valve insert is embodied with a connecting element, in order to connect the two sides of the valve insert, embodied as a slit sleeve, to one another in the region of the integrally formed collar. By means of this connecting element, the stability and strength depending on shape or design of the collar are advantageously increased, so that widening, even under strong press-fitting forces, can be averted. On one side of the slit, the connecting element may be embodied as a peg, for instance, and on the other side of the slit for instance as a corresponding bore for receiving the peg. Alternatively, the two sides of the slit can be embodied for instance as overlapping connecting elements. Then a top side has a detent lug and a detent indentation, for instance, which cooperate with a corresponding detent lug and a corresponding detent indentation of an underside. By means of such "meshing" of the two sides of the slit, the stability of the integrally formed collar of the valve insert can advantageously be increased as well.

In a feature of the valve cartridge of the invention, the outer contour of the integrally formed collar can be embodied as circular or undulating. In addition or alternatively, the integrally formed collar is embodied with a shape that protrudes out of the plane, so that the result is an undulating, encompassing collar of free geometry in plan view. By means of this additional shaping, positive effects for the strength depending on shape or design of the collar can advantageously be attained.

In a further feature of the valve cartridge of the invention, the connecting elements can be integrally formed onto the collar before or during the press-fitting of the valve body into the valve insert. Moreover, depending on practicality, the additional shaping of the collar can be done either directly in the production of the valve insert or during the press-fitting of the valve body into the valve insert for bracing against the press-fitting forces.

The valve cartridge of the invention can be used for instance in solenoid valves that are open or closed when without current.

Advantageous embodiments of the invention, described below, as well as conventional exemplary embodiments explained above for the sake of better comprehension of the invention, are shown in the drawings. In the drawings, identical reference numerals identify components and elements that perform the same or analogous functions.

BRIEF DESCRIPTION OF THE DRAWINGS

The invention will be described below in conjunction with the accompanying drawings, in which.

DESCRIPTION OF THE PREFERRED EMBODIMENTS

Figure 1:
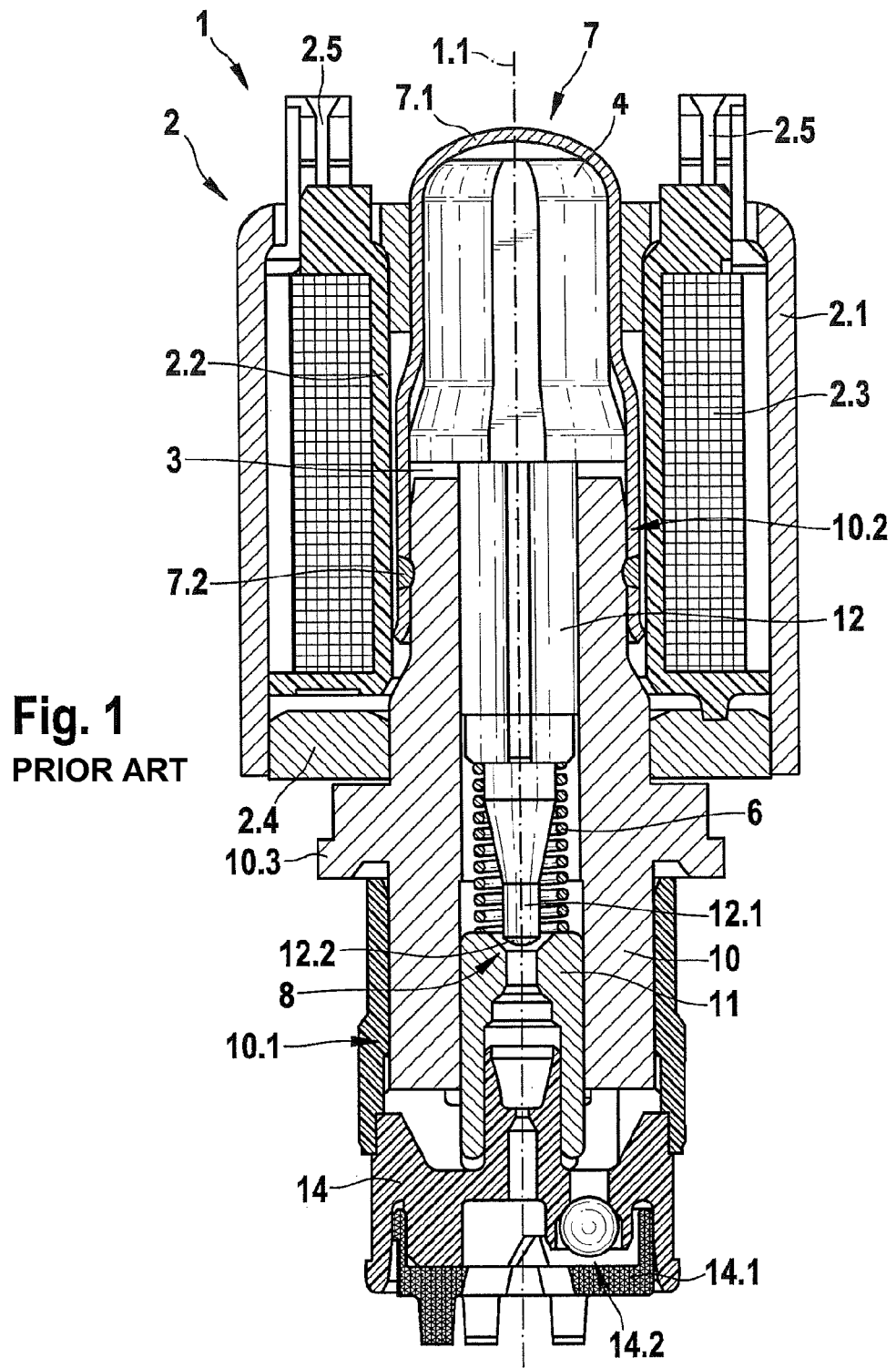
FIG. 1 shows a schematic sectional view of a conventional solenoid valve.
Figure 2:
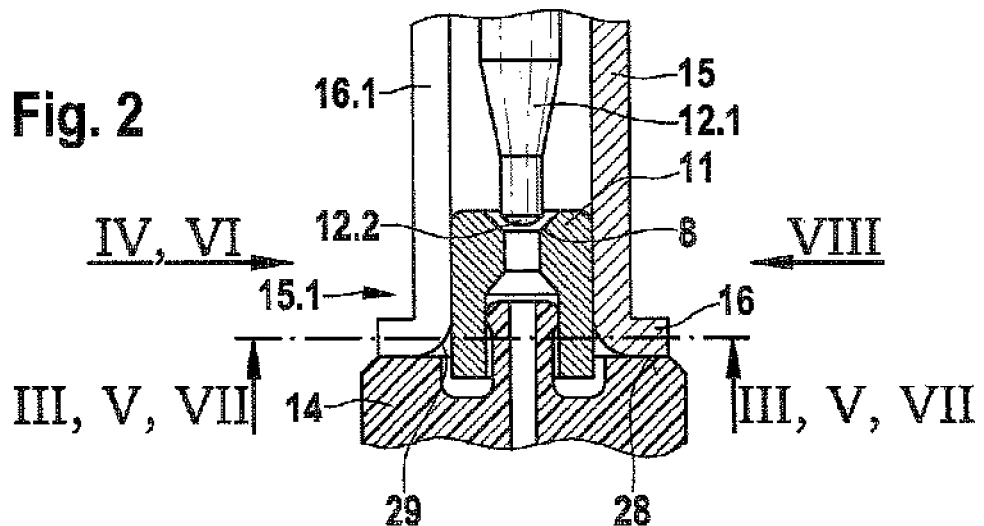
FIG. 2 shows a schematic sectional view of components essential to the invention of a valve cartridge for a solenoid valve.
Figure 3:
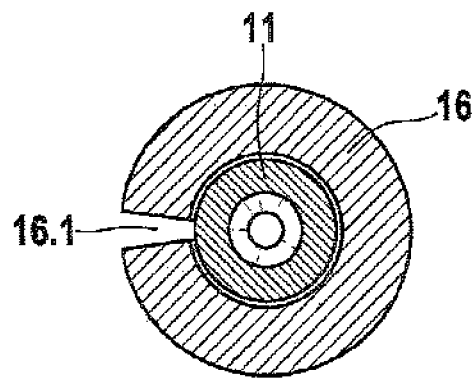
FIG. 3 shows a schematic sectional view of a first embodiment of the valve cartridge of the invention, without a lower valve part, along the section line III-III of FIG. 2.
Figure 4:
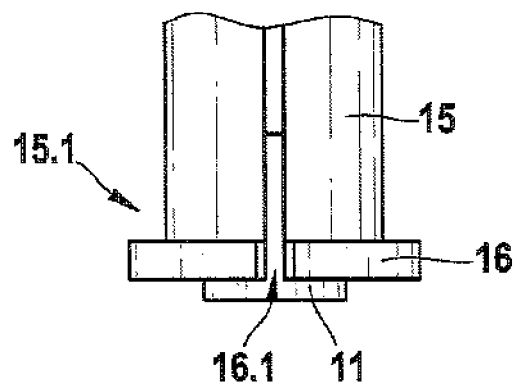
FIG. 4 shows a schematic view of a side view of the first embodiment of the valve cartridge of the invention, without the lower valve part, in the direction of the arrow IV in FIG. 2.

As can be seen from FIGS. 2 through 4, a valve insert 15 for a valve cartridge of the invention is embodied, in a distinction from the valve insert 10 of the conventional valve cartridge 7 of FIG. 1, as a slit sleeve, into which on one end 15.1 a valve body 11 that has a main valve seat 8 is press-fitted. By its other end, not shown, the valve insert 15 is thrust into a capsule, not shown. The valve body 11 having the main valve seat 8 can for instance be embodied similarly to the valve body 11 of the conventional valve cartridge 7 of FIG. 1. A tappet which is guided longitudinally movably inside the valve insert 15 has a closing element 12.1 with a sealing element 12.2 that for performing a sealing function plunges sealingly into the main valve seat 8 of the valve body 11. The tappet may be embodied analogously to the tappet of the conventional valve cartridge 7 of FIG. 1 and can be moved inside the valve insert 15 by means of a magnet armature 4 (FIG. 1) that is moved by a magnetic force that is generated.

As can further be seen from FIGS. 2 through 4, in a first exemplary embodiment, a circular collar 16 with a slit 16.1 is integrally formed onto the end 15.1 shown of the valve insert 15, in order to increase an outside diameter and the strength depending on shape or design of the valve insert 15. By the integral forming of the circular collar 16, the outer diameter and the strength depending on shape or design of the valve insert 15, embodied as a slit sleeve, are increased, so that the valve insert 15 is advantageously capable of absorbing radially acting press-fitting forces without additional components and without additional widening; the press-fitting forces arise when the valve body 11 is press-fitted into the end 15.1 shown of the valve insert 15 embodied as a slit sleeve. Also by means of the integrally formed collar 16, a contact area 28 for a lower valve part 14 pressed axially against the valve insert 15, and furthermore braced on the valve insert 15, is increased. The lower valve part 14 is embodied for instance analogously to the conventional solenoid valve 1 in FIG. 1 as a plastic insert and for instance additionally serves to receive a check valve, to seal off from a surrounding fluid block, for sealing off from the valve body 11, and for receiving a flat filter. Moreover, by the integral forming of the collar 16 onto the valve insert 15 embodied as a sleeve, an introduction edge 29 for the valve body 11 can be embodied as a radius, which makes non-metal-cutting mounting of the valve body 11 possible.

Figure 5:
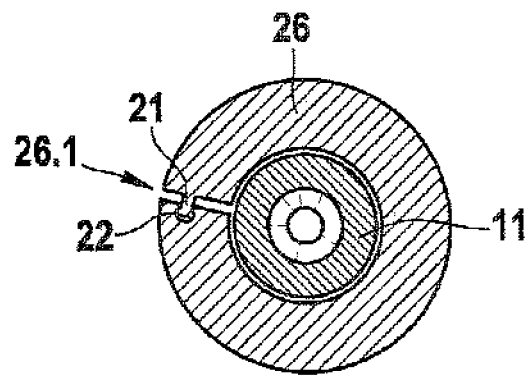
FIG. 5 shows a schematic sectional view of a second embodiment of the valve cartridge of the invention, without a lower valve part, along the section line V-V of FIG. 2.
Figure 6:
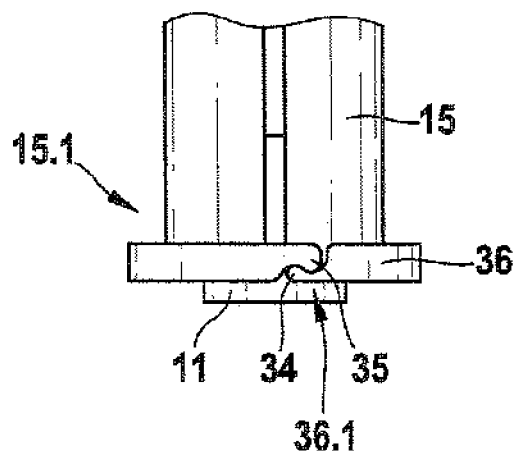
FIG. 6 shows a schematic view of a side view of the third embodiment of the valve cartridge of the invention, without the lower valve part, in the direction of the arrow VI in FIG. 2.

As can be seen from FIGS. 5 and 6, in further embodiments, the integrally formed collar 26, 36 of the valve insert 15 can be embodied with connecting elements in order to connect the two sides of the valve insert 15, embodied as a slit sleeve, to one another in the vicinity of the integrally formed collar 26 and 36, respectively. The connecting elements increase the stability and the strength depending on shape or design of the collar 26, 36 in an advantageous way, so that widening of the valve insert 15 embodied as a sleeve can be prevented even in the presence of strong press-fitting forces.

As can further be seen from FIG. 5, in a second exemplary embodiment the connecting elements of the collar 26 integrally formed onto the valve insert 15 are embodied as a peg 21 on one side of the slit 26.1 and as a corresponding bore 22 for receiving the peg 21 on another side of the slit 26.1.

As can further be seen from FIG. 6, in a third exemplary embodiment of the collar 36, integrally formed onto the valve insert 15, the two sides of the slit 36.1 are embodied as overlapping connecting elements. Here, a top side 35 of the overlapping connecting elements has a detent lug and a detent indentation, which cooperate with a corresponding detent lug and a corresponding detent indentation of an underside 34 of the overlapping connecting elements. By the meshing of the two sides of the slit, the stability of the collar 36 of the valve insert 15 can again be increased.

Figure 7:
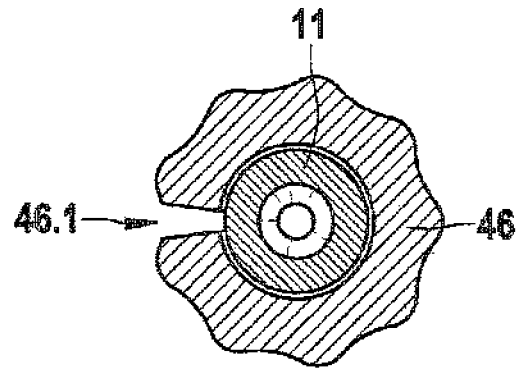
FIG. 7 shows a schematic sectional view of a fourth embodiment of the valve cartridge of the invention, without a lower valve part, along the section line VII-VII of FIG. 2.
Figure 8:
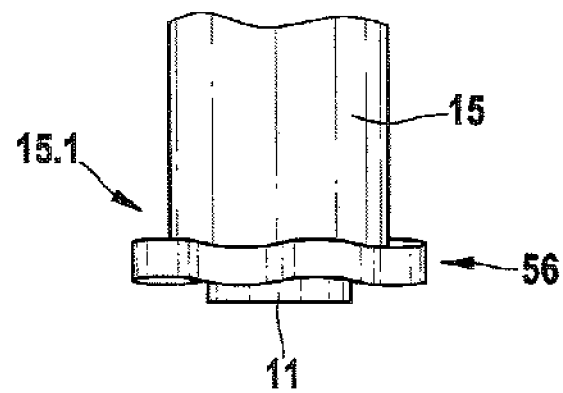
FIG. 8 shows a schematic view of a side view of the fifth embodiment of the valve cartridge of the invention, without the lower valve part, in the direction of the arrow VIII in FIG. 2.

As can be from FIGS. 7 and 8, the shaping of the collar 46, 56 integrally formed onto the valve insert 15 can be done in accordance with further embodiments such that positive effects for the strength depending on shape or design of the collar 46, 56 are obtained. As can further be seen from FIG. 7, in a fourth exemplary embodiment, the outer contour of the integrally formed slit collar 46 is embodied in undulating form. In the fourth exemplary embodiment shown, both sides of the slit 46.1 in the integrally formed collar 46 are not connected to one another via connecting elements. In an embodiment, not shown, of the integrally formed collar with an undulating outer contour, there are connecting elements for connecting the two sides of the slit in the integrally formed collar to one another. As can further be seen from FIG. 8, the integrally formed collar 56 is embodied with a shape that protrudes from the plane, resulting in an undulating, encompassing collar 56 with free geometry in plan view.

The connecting elements 21, 22, 34, 35 can be integrally formed onto the collar 26 and 36, respectively, before or during the press-fitting of the valve body 11 into the valve insert 15. Moreover, depending on practicability, the additional shaping of the collar 46 and 56 can be done either directly in the manufacture of the valve insert 15, or during the press-fitting of the valve body 11 into the valve insert 15 for bracing against the press-fitting forces.

The valve cartridge of the invention for a solenoid valve, having the valve insert embodied as a slit sleeve, advantageously makes it possible, by means of the integrally formed collar, to absorb the press-fitting forces of the valve body without additional components. As a result of the enlargement of the outside diameter of the valve insert accomplished by the integrally formed collar, the strength depending on shape or design of the valve insert is increased, so that the press-fitting forces for the valve body can be absorbed without impermissible widening.

The foregoing relates to the preferred exemplary embodiments of the invention, it being understood that other variants and embodiments thereof are possible within the spirit and scope of the invention, the latter being defined by the appended claims.

The invention claimed is:

1. A valve cartridge for a solenoid valve, the valve cartridge comprising: a capsule, a magnet armature guided movably inside the capsule, a valve insert which is inserted by a first end into the capsule, and a valve body which is press-fitted into a second end of the valve insert, wherein the valve body has a main valve seat, and the magnet armature, moved by a generated magnetic force, moves a tappet, guided inside the valve insert, that has a closing element with a sealing element, and the sealing element, for performing a sealing function, plunges sealingly into the main valve seat of the valve body, and wherein the valve insert is embodied as a slit sleeve, and a collar is integrally formed onto the second end of the valve insert in order to increase an outside diameter and strength of the valve insert depending on shape or design of the valve insert.

2. The valve cartridge as defined by claim 1, wherein the valve insert has an introduction edge for the valve body which is embodied as a radius on the second end of the valve insert.

3. A solenoid valve, including a valve cartridge as defined by claim 1.

4. The valve cartridge as defined by claim 1, wherein an outer contour of the integrally formed collar is embodied as circular or undulating.

5. The valve cartridge as defined by claim 4, wherein shaping of the outer contour of the collar is effected before or during press-fitting of the valve body into the valve insert.

6. The valve cartridge as defined by claim 1, wherein the integrally formed collar is embodied with a shape that protrudes out of a plane of the collar so that the result is an undulating, encompassing collar of free geometry in plan view.

7. The valve cartridge as defined by claim 6, wherein shaping of the undulating collar is effected before or during press-fitting of the valve body into the valve insert.

8. The valve cartridge as defined by claim 1, wherein the integrally formed collar of the valve insert is embodied with connecting elements in order to connect two sides of the valve insert to one another in a vicinity of the integrally formed collar.

9. The valve cartridge as defined by claim 8, wherein the connecting elements are integrally formed on the collar before or during press-fitting of the valve body into the valve insert.

10. The valve cartridge as defined by claim 8, wherein the connecting elements are embodied on one side of the slit as a peg and on an other side of the slit as a corresponding bore for receiving the peg.

11. The valve cartridge as defined by claim 10, wherein the connecting elements are integrally formed on the collar before or during press-fitting of the valve body into the valve insert.

12. The valve cartridge as defined by claim 8, wherein the two sides of the slit are embodied as overlapping connecting elements, and a top side has a detent lug and a detent indentation which cooperate with a corresponding detent lug and a corresponding detent indentation of an underside.

13. The valve cartridge as defined by claim 12, wherein the connecting elements are integrally formed on the collar before or during press-fitting of the valve body into the valve insert.

14. The valve cartridge as defined by claim 1, wherein a lower valve part is pressed and braced axially against the valve insert.

15. The valve cartridge as defined by claim 14, wherein the valve insert has an introduction edge for the valve body which is embodied as a radius on the second end of the valve insert.

16. The valve cartridge as defined by claim 15, wherein the integrally formed collar of the valve insert is embodied with connecting elements in order to connect two sides of the valve insert to one another in a vicinity of the integrally formed collar.

17. The valve cartridge as defined by claim 16, wherein the two sides of the slit are embodied as overlapping connecting elements, and a top side has a detent lug and a detent indentation which cooperate with a corresponding detent lug and a corresponding detent indentation of an underside.

18. The valve cartridge as defined by claim 16, wherein the connecting elements are embodied on one side of the slit as a peg and on an other side of the slit as a corresponding bore for receiving the peg.

19. The valve cartridge as defined by claim 18, wherein an outer contour of the integrally formed collar is embodied as circular or undulating.

20. The valve cartridge as defined by claim 18, wherein the integrally formed collar is embodied with a shape that protrudes out of a plane of the collar so that the result is an undulating, encompassing collar of free geometry in plan view.

* * * * *